(12) United States Patent
Demmer

(10) Patent No.: US 8,667,922 B2
(45) Date of Patent: Mar. 11, 2014

(54) CLOSURE ELEMENT FOR A FUEL TANK OF A MOTOR VEHICLE

(75) Inventor: Stefan Demmer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 350 days.

(21) Appl. No.: 12/624,025

(22) Filed: Nov. 23, 2009

(65) Prior Publication Data

US 2010/0072202 A1    Mar. 25, 2010

Related U.S. Application Data

(63) Continuation of application No. PCT/EP2008/004514, filed on Jun. 6, 2008.

(30) Foreign Application Priority Data

Jul. 19, 2007    (DE) .......................... 10 2007 033 535

(51) Int. Cl.
*G01L 19/12*    (2006.01)

(52) U.S. Cl.
CPC ...................................... *G01L 19/12* (2013.01)
USPC ........ 116/271; 116/284; 116/285; 206/459.1; 220/86.2; 220/315

(58) Field of Classification Search
USPC ........... 220/DIG. 33, DIG. 16, 86.2, DIG. 32, 220/200, 212, 315; 116/70, 266, 271, 284, 116/285; 206/459.1, 459.5
See application file for complete search history.

(56) References Cited

U.S. PATENT DOCUMENTS

| | | | |
|---|---|---|---|
| 3,587,912 A * | 6/1971 | Ohta | 220/231 |
| 4,510,893 A | 4/1985 | Schweiger et al. | |
| 4,821,697 A | 4/1989 | McDougal | |
| 4,830,213 A * | 5/1989 | Sleder | 220/203.19 |
| 4,944,323 A | 7/1990 | Bartholomew et al. | |

(Continued)

FOREIGN PATENT DOCUMENTS

| | | |
|---|---|---|
| DE | 39 16 574 A1 | 11/1990 |
| DE | 41 02 961 A1 | 8/1991 |

(Continued)

OTHER PUBLICATIONS

German Search Report dated Jun. 24, 2008 including partial English translation (Nine (9) pages).
International Search Report dated Dec. 10, 2008 including English translation (Four (4) pages).

*Primary Examiner* — Robert J Hicks
*Assistant Examiner* — Kareen Rush
(74) *Attorney, Agent, or Firm* — Crowell & Moring LLP

(57) ABSTRACT

A closure element is provided for a fuel tank of a motor vehicle, in which tank an at least slight excess pressure and/or vacuum may exist. An indication is provided on the closure element, by which indication the operator is informed of the presence of excess pressure and/or vacuum in the tank. The indication takes place mechanically by way of a mechanical pressure sensor, specifically with respect to the presence of essentially ambient pressure or excess pressure by use of different colors. For this purpose, an indicating dial can be provided in the closure element, which indicating dial can be rotated by way of a pin displaceable against a spring force under the influence of the pressure existing in the tank. A jacket segment being recognizable by the operator through a window.

16 Claims, 1 Drawing Sheet

(56) References Cited

U.S. PATENT DOCUMENTS

| | | | |
|---|---|---|---|
| 5,429,097 A | 7/1995 | Wojts-Saary et al. | |
| 6,035,906 A * | 3/2000 | Ott | 141/312 |
| 6,158,606 A * | 12/2000 | Oliver | 220/203.04 |
| 7,114,470 B2 * | 10/2006 | Ramanathan et al. | 123/41.54 |
| 7,353,965 B2 | 4/2008 | Reutter | |
| 7,380,681 B2 * | 6/2008 | Reutter | 220/203.27 |
| 8,261,581 B2 * | 9/2012 | Cerruti et al. | 68/17 R |
| 2007/0051724 A1 * | 3/2007 | DeCapua et al. | 220/203.28 |

FOREIGN PATENT DOCUMENTS

| | | |
|---|---|---|
| DE | 42 41 274 C2 | 1/1994 |
| DE | 38 85 599 T2 | 3/1994 |
| DE | 100 24 815 A1 | 11/2001 |
| DE | 100 35 729 A1 | 1/2002 |
| DE | 10 2007 011 891 A1 | 9/2008 |
| EP | 0 163 006 A1 | 12/1985 |
| EP | 1 155 896 A2 | 11/2001 |

* cited by examiner

CLOSURE ELEMENT FOR A FUEL TANK OF A MOTOR VEHICLE

CROSS-REFERENCE TO RELATED APPLICATIONS

This application is a continuation of PCT International Application No. PCT/EP2008/004514, filed Jun. 6, 2008, which claims priority under 35 U.S.C. § 119 to German Patent Application No. DE 10 2007 033 535.2, filed Jul. 19, 2007, the entire disclosures of which are herein expressly incorporated by reference.

BACKGROUND AND SUMMARY OF THE INVENTION

The invention relates to a closure element for a fuel tank of a motor vehicle. The closure element can be removed from the tank or from a filler neck of the tank at least in sections by an operator in order to fill the tank, in which case at least a slight excess pressure and/or vacuum may exist in the fuel tank. With respect to the associated technical fields, in addition to German Patent Document DE 100 35 729 A1 as well as European Patent Document EP 0 163 006 A1, reference is also made to German Patent Application 10 2007 011 891, which is not a prior publication.

In the case of conventional fuel tanks, among other situations, when filling the fuel tank, the air previously contained in the fuel tank is removed by way of a ventilation, vent opening, or venting device, in which case the fuel constituents contained in the removed air flow can be intermediately stored in a so-called activated-carbon filter, through which the removed air flow is guided, in order to avoid harm to the environment as a result of these unburned fuel constituents. Fuel vapors are also intermediately stored in the activated-carbon filter. These fuel vapors result from the evaporation of fuel in the fuel tank of the motor vehicle operated, in particular, in ambient heat or when parked in a hot condition. Because no significant excess pressure should form in the fuel tank as a result of this evaporation, a venting of the tank by way of the activated-carbon filter has to take place also under these conditions.

The above-mentioned activated-carbon filter has to be cleansed repeatedly, in which case ambient air is guided through and, together with the fuel constituents then released again by the activated-carbon filter, is fed for combustion to an internal-combustion engine of the motor vehicle for whose supply the fuel tank is provided. This described technique has basically been successful. However, for example, in the case of so-called hybrid-type motor vehicles which, alternatively to an internal-combustion engine, can also be driven by an electric motor (or another motor not supplied from the fuel tank), the technique has certain drawbacks. In such case of a hybrid vehicle, there may be long time periods of the driving operation of the vehicle during which the internal-combustion engine is not operated and, therefore, an effective or reliable cleansing of the activated-carbon filter will not be possible.

It is suggested, for example, in the above-mentioned German Patent Document DE 41 02 961 to permit the forming and maintaining of excess pressure of a certain amount in the closed fuel tank. This excess pressure may occur particularly when the fuel tank is more or less filled; for example, when the latter is heated (under ambient influences and/or by the waste heat of the exhaust system of the vehicle internal-combustion engine), and no fuel is removed. In the case of a hybrid-type motor vehicle, this will occur when the motor vehicle is driven by an electric motor and the electric vehicle-driving motor is fed from an energy accumulator. The evaporation of the fuel in the tank resulting from the exterior input of heat will increase its internal pressure, which now can also be permitted up to a certain pressure value, so that until then no venting or ventilating of the tank will be necessary. As a result, no flow through a possibly still present activated-carbon filter will occur. Advantageously, the excess pressure present in the fuel tank will additionally reduce the tendency of the fuel to evaporate.

However, when excess pressure is present in the fuel tank, it will no longer be possible to fill the tank as easily as with conventional, non-closed fuel tanks, in which no excess pressure can occur in the tank because of forced venting. Specifically, if a conventional closure device of a conventional tank filler pipe were opened in the presence of excess pressure in the tank, an abrupt pressure drop would take place connected with the danger that fuel would spill out, but particularly with corresponding damage to the environment by the gaseous fuel constituents accumulated in the tank.

As a remedial measure, a motor vehicle tank system is suggested for this purpose in the above-mentioned German Patent Application 10 2007 011 891, (not a prior publication), which tank system has a tank and a filler pipe which can be closed in a pressure-tight manner by way of a closure device that can be locked against an opening and in which case a locking device for the closure device permits an opening of the latter only when essentially no excess pressure is present in the tank with respect to the ambient pressure. In this case, the driver of the vehicle or a gas station attendant can be visually informed of the locked condition of the closure device.

It is an object of the present invention to provide a further improvement in this associated technical field, i.e. for a closure element of a fuel tank.

The object is achieved in that a display is provided on the closure element (or close to the closure element), by which the operator is informed of the presence of excess pressure and/or of a vacuum in the fuel tank. Advantageous embodiments and further developments are described herein.

First, it was recognized that it possibly may not be necessary at all to lock the closure element when excess pressure (or a vacuum) is present in the fuel tank. The reason is that it is definitely possible that, under these conditions, this closure element cannot be opened at all. In such a case—but not only in this case—an operator who wants to open the closure element and who preferably is the driver of the motor vehicle or a gas station attendant is to be explicitly informed that an excess pressure or a vacuum is present in the tank. Naturally, such information will also be helpful when the closure element is locked because of the presence of excess pressure. Normally, in the case of an intended refueling of the motor vehicle (and thus in the case of an intended opening of the tank closure element), a ventilating operation could be initiated automatically, but this is not the content of the present invention. On the contrary, in the present case, it is suggested to inform a so-called operator in a manner that is as simple as possible when the fuel tank is currently not yet opened, i.e. the closure element currently cannot yet be taken off the tank filler neck or the like because excess pressure or vacuum pressure is still present in the fuel tank.

In a particularly simple manner and especially without the aid of electricity, which should basically be kept away from a tank filler neck, the display of excess pressure or a vacuum (with respect to the ambient pressure) can take place mechanically by way of a mechanical pressure sensor. For this purpose and for improving clarity, an indicating dial can be provided preferably in the closure element, which indicating dial can be rotated by way of a pin displaceable against spring force under the influence of the pressure existing in the tank, a jacket segment of the indicating dial representing the respectively existing pressure being recognizable by the operator through a window.

The above-mentioned indication concerning the presence of essentially ambient pressure, excess pressure, and/or a vacuum may take place in different colors, for example, such that a red color points to the presence of excess pressure (or a vacuum) while a green color indicates that essentially ambient pressure is present in the tank in which case the tank or the closure element can therefore be opened. In addition or as an alternative, a corresponding/suitable label (text) may be provided. In addition, a mechanical locking element may be applied to or provided on or in the closure element, which mechanical locking element, mechanically activated (for example, by way of a toothing) by excess pressure or a vacuum in the tank, prevents an opening of the closure element, as already known on motor vehicles, for example, for the expansion tank for the coolant of a liquid-cooled internal-combustion engine (see, for example, EP 0163006 A1, also published as U.S. Pat. No. 7,353,965 B2).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
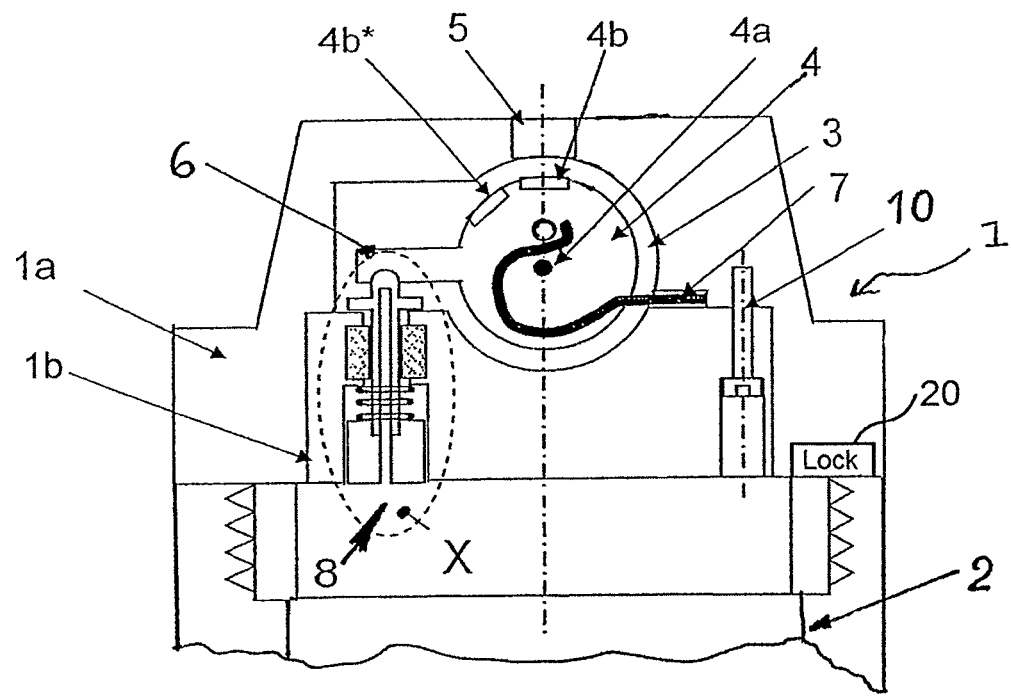
FIG. 1 is a schematic diagram of a sectional view of a preferred embodiment.

Reference number 1 indicates a closure element in the form of a basically conventional filler neck cap, for example, a bayonet cap, placed on a filler neck 2 of a fuel tank of a motor vehicle (otherwise not shown). In a head part 1a of this closure element 1, an indicating dial or roller 4 is, rotatably about its axis 4a, disposed in a recess 3 that is sealed off with respect to the filler neck 2 (or the tank interior) by way of a so-called foot part 1b. The foot part 1b is fastened to the head part 1a by use of screws 10. In this case, a jacket segment 4b of this indicating dial 4 is visible to the outside by way of a window 5, specifically visible to an operator who wants to take off or remove the closure element 1 at least in sections from the filler neck 2. A lever 6 and a restoring spring 7, constructed as a flat coil spring, are applied to this indicating dial 4.

Figure 2:
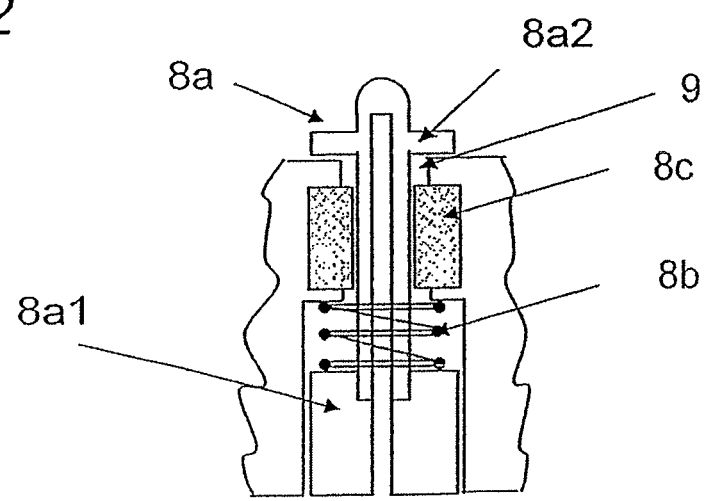
FIG. 2 is a view of a mechanical pressure sensor from FIG. 1 illustrated as an enlarged cutout X.

A mechanical pressure sensor which, as a whole, is identified by reference number 8 is arranged in the foot part 1b. The pressure sensor 8 can mechanically act upon the lever 6 such that, when a significant excess pressure (with respect to the ambient pressure) is present in the tank 4, the indicating dial or roller 4 is rotated slightly about its axis 4a with respect to its position in the case of ambient pressure in the tank. This mechanical pressure sensor 8 may be designed, for example, similar to the pressure indicator known in the case of steam pressure cookers, having a pin 8a which is linearly displaceable against the force of a spring element 8b (see FIG. 2). On the one hand, the pressure within the filler neck 2 acts upon the head part 8a1 of the pin 8a and the spring element 8b acts in the opposite direction thereto, the lever 6 of the indicating dial 4 being supported on the foot part 8a2 of the pin 8a. With the intermediate position of a sealing element 8c, this pin 8a is guided in a bore 9 in the closure element 1, in which case —in order to permit a displacement of the pin 8a as a result of excess pressure in the filler neck 2 —the free surface of the head part 8a1 which faces the foot part 8a2 and which can be acted upon by the above-mentioned excess pressure, is smaller than the surface of the head part 8a1 which is on the bottom in the figures and faces away from the foot part 8a2. As a result, starting from its position at ambient pressure in the tank, the pin 8a is pushed upward in the representations of the figures when there is excess pressure in the tank, whereby the indicating dial, starting from the illustrated position in FIG. 1, is rotated clockwise so far that, instead of the, for example, green jacket segment 4b of the indicator dial 4 being visible from the outside through the window 5 in the illustrated position, a different, for example, red jacket segment 4b* becomes visible from the outside through the window 5. In this case, it should also be pointed out that this window 5, as well as a plurality of additional details, may definitely be designed to deviate from the above explanations without departing from the spirit of the invention. Further, a mechanical lock, shown schematically at 20, may be applied to or provided on or in the closure element 1. Such a mechanical lock may be of the type known from EP 0163006 A1 for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component for a motor vehicle having a fuel tank in which an at least slight excess pressure or vacuum may exist, comprising:
    a closure element for the fuel tank, the closure element being at least partially removable from one of the tank and a filler neck of the tank in order to allow for a filling of the tank; and
    an indicator operatively configured with respect to the closure element, the indicator providing an indication to an operator of a still present excess pressure or vacuum in the fuel tank without affecting the excess pressure or vacuum in the fuel tank.

2. A component for a motor vehicle having a fuel tank in which an at least slight excess pressure or vacuum may exist, comprising:
    a closure element for the fuel tank, the closure element being at least partially removable from one of the tank and a filler neck of the tank in order to allow for a filling of the tank; and
    an indicator operatively configured with respect to the closure element, the indicator providing an indication to an operator of a still present excess pressure or vacuum in the fuel tank,
    wherein the indicator includes a mechanical pressure sensor integrated into and removable with the closure element to provide an indication of the pressure or vacuum in the tank.

3. The component according to claim 1, wherein the indicator utilizes different colors to indicate the presence of essentially ambient pressure, excess pressure, or vacuum in the fuel tank.

4. The component according to claim 2, wherein the indicator utilizes different colors to indicate the presence of essentially ambient pressure, excess pressure, or vacuum in the fuel tank.

5. The component according to claim 1, wherein the indicator is an indicating roller operatively arranged in the closure element, said indicating roller being rotatable by way of a pin displaced against a spring force under influence of a pressure existing in the fuel tank; and
   a jacket segment of the indicating roller representing a respectively existing pressure being recognizable by an operator through a window of the closure element.

6. The component according to claim 2, wherein the indicator is an indicating roller operatively arranged in the closure element, said indicating roller being rotatable by way of a pin displaced against a spring force under influence of a pressure existing in the fuel tank; and
   a jacket segment of the indicating roller representing a respectively existing pressure being recognizable by an operator through a window of the closure element.

7. The component according to claim 3, wherein the indicator is an indicating roller operatively arranged in the closure element, said indicating roller being rotatable by way of a pin displaced against a spring force under influence of a pressure existing in the fuel tank; and
   a jacket segment of the indicating roller representing a respectively existing pressure being recognizable by an operator through a window of the closure element.

8. The component according to claim 1, further comprising a mechanical lock operatively configured with respect to the closure element, said mechanical lock being mechanically activatable by excess pressure or a vacuum in the fuel tank to prevent an opening of the closure element.

9. The component according to claim 4, further comprising a mechanical lock operatively configured with respect to the closure element, said mechanical lock being mechanically activatable by excess pressure or a vacuum in the fuel tank to prevent an opening of the closure element.

10. The component according to claim 5, further comprising a mechanical lock operatively configured with respect to the closure element, said mechanical lock being mechanically activatable by excess pressure or a vacuum in the fuel tank to prevent an opening of the closure element.

11. The component according to claim 7, further comprising a mechanical lock operatively configured with respect to the closure element, said mechanical lock being mechanically activatable by excess pressure or a vacuum in the fuel tank to prevent an opening of the closure element.

12. A fuel system for a motor vehicle, comprising:
   a fuel tank in which an at least slight excess pressure or vacuum may exist;
   a closure element for the fuel tank, the closure element being at least partially removable from one of the tank and a filler neck of the tank in order to allow for a filling of the tank; and
   an indicator operatively configured with respect to the closure element, the indicator providing a visual indication to an operator of a still present excess pressure or vacuum in the fuel tank without affecting the excess pressure or vacuum.

13. The fuel system according to claim 12, wherein the indicator includes a mechanical pressure sensor configured to provide an indication of the pressure or vacuum in the tank.

14. The fuel system according to claim 13, wherein the indicator utilizes different colors to indicate the presence of essentially ambient pressure, excess pressure, or vacuum in the fuel tank.

15. The fuel system according to claim 12, wherein the indicator is an indicating roller operatively arranged in the closure element, said indicating roller being rotatable by way of a pin displaced against a spring force under influence of a pressure existing in the fuel tank; and
   a jacket segment of the indicating roller representing a respectively existing pressure being recognizable by an operator through a window of the closure element.

16. The fuel system according to claim 12, further comprising a mechanical lock operatively configured with respect to the closure element, said mechanical lock being mechanically activatable by excess pressure or a vacuum in the fuel tank to prevent an opening of the closure element.

* * * * *